US009079460B2

(12) United States Patent
Ochi (10) Patent No.: US 9,079,460 B2
(45) Date of Patent: Jul. 14, 2015

(54) PNEUMATIC TIRE

(75) Inventor: Naoya Ochi, Higashimurayama (JP)

(73) Assignee: BRIDGESTONE CORPORATION, Tokyo (JP)

(*) Notice: Subject to any disclaimer, the term of this patent is extended or adjusted under 35 U.S.C. 154(b) by 1199 days.

(21) Appl. No.: 13/002,167

(22) PCT Filed: Jun. 24, 2009

(86) PCT No.: PCT/JP2009/061521
§ 371 (c)(1),
(2), (4) Date: Feb. 16, 2011

(87) PCT Pub. No.: WO2010/001785
PCT Pub. Date: Jan. 7, 2010

(65) Prior Publication Data
US 2011/0146863 A1   Jun. 23, 2011

(30) Foreign Application Priority Data
Jul. 3, 2008   (JP) .................. 2008-174656

(51) Int. Cl.
B60C 11/12   (2006.01)
B60C 11/03   (2006.01)
B60C 11/04   (2006.01)

(52) U.S. Cl.
CPC .......... B60C 11/125 (2013.04); B60C 11/0304 (2013.04); B60C 11/0306 (2013.04);
(Continued)

(58) Field of Classification Search
CPC .......... B60C 11/0306; B60C 11/0309; B60C 11/042; B60C 11/0304; B60C 11/125; B60C 2011/1209; B60C 11/1353; B60C 2011/1361; B60C 11/1307; B60C 2011/133; B60C 2011/1338; B60C 2011/0388; B60C 2011/0381

USPC ............ 152/209.1, 209.3, 209.12, 209.18, 152/209.25, 209.26, 209.27
See application file for complete search history.

(56) References Cited

U.S. PATENT DOCUMENTS 3,254,693 A * 6/1966 Travers ............... 152/209.5
3,534,798 A * 10/1970 Ravenhall ........... 152/209.21
(Continued)

FOREIGN PATENT DOCUMENTS

JP   61-166708 A   7/1986
JP   63-297108 A   12/1988
(Continued)

OTHER PUBLICATIONS

Supplementary European Search Report issued in the counterpart European application No. 09773363.8 dated Aug. 3, 2011.
(Continued)

*Primary Examiner* — Seyed Masoud Malekzadeh
(74) *Attorney, Agent, or Firm* — Sughrue Mion, PLLC (57) ABSTRACT

In a present invention, in a pneumatic tire 1A, a circumferential groove 32 extending in a tire circumferential direction is formed by land portions 20 constituting a tread surface 10 coming into contact with a road surface. A flat groove portion 60 and an in-groove land portion 70 are formed in the circumferential groove 32. The flat groove portion 60 is a flat surface of a groove bottom 32a of the circumferential groove 32. The in-groove land portion 70 is raised toward the tread surface 10 side from the groove bottom 32a of the circumferential groove 32. Multiple narrow grooves 80 extending in a tread width direction are formed in the in-groove land portion 70. A wide-groove width W1 of the circumferential groove 32 in the tread width direction is 5 to 30% of a tread width TW of the tread surface in the tread width direction.

11 Claims, 7 Drawing Sheets

(52) U.S. Cl.
CPC ........... B60C11/0309 (2013.04); B60C 11/042 (2013.04); *B60C 2011/0381* (2013.04); *B60C 2011/0388* (2013.04); *B60C 2011/1209* (2013.04); *B60C 2011/133* (2013.04); *B60C 2011/1338* (2013.04); *B60C 2011/1361* (2013.04)

(56) References Cited

U.S. PATENT DOCUMENTS

| | | | |
|---|---|---|---|
| 5,154,216 A * | 10/1992 | Ochiai et al. | 152/209.21 |
| 5,492,161 A | 2/1996 | Fuchikami et al. | |
| 5,618,360 A * | 4/1997 | Sakuno | 152/209.3 |
| 5,643,373 A * | 7/1997 | Iwasaki | 152/209.15 |
| 5,679,185 A * | 10/1997 | Tanaka | 152/209.9 |
| 5,685,927 A * | 11/1997 | Hammond et al. | 152/209.26 |
| 5,688,342 A * | 11/1997 | Sugihara | 152/209.9 |
| 5,837,074 A * | 11/1998 | Uemura | 152/209.18 |
| 6,123,130 A * | 9/2000 | Himuro et al. | 152/209.3 |
| 6,340,041 B1 * | 1/2002 | Sugihara et al. | 152/209.5 |
| 6,439,284 B1 * | 8/2002 | Fontaine | 152/209.15 |
| 6,918,420 B2 * | 7/2005 | Matsumoto | 152/209.8 |
| 8,151,842 B2 * | 4/2012 | Takahashi et al. | 152/209.3 |
| 8,181,682 B2 * | 5/2012 | Miyazaki | 152/209.21 |
| 2008/0121326 A1 * | 5/2008 | Ohara | 152/209.24 |
| 2009/0114325 A1 * | 5/2009 | Ishizaka | 152/209.26 |
| 2011/0203709 A1 | 8/2011 | Behr et al. | |

FOREIGN PATENT DOCUMENTS

| | | |
|---|---|---|
| JP | 01-215603 A | 8/1989 |
| JP | 01-215604 A | 8/1989 |
| JP | 10-226207 A | 8/1998 |
| JP | 2000-177331 A | 6/2000 |
| JP | 2000-255217 A | 9/2000 |
| JP | 2001-277818 A | 10/2001 |
| WO | 2010/049264 A1 | 5/2010 |

OTHER PUBLICATIONS

International Search Report issued in PCT/JP2009/061521 dated Aug. 18, 2009.

Japanese Office Action dated Oct. 30, 2012 issued in Japanese Patent Application No. 2008-174656.

Chinese Office Action dated Sep. 26, 2012 issued in Chinese Patent Application No. 200980125549.0.

* cited by examiner

PNEUMATIC TIRE

TECHNICAL FIELD

The present invention relates to a pneumatic tire in which circumferential grooves extending in a tire circumferential direction are formed, and particularly to a pneumatic tire designed for icy and snowy roads.

BACKGROUND ART

Heretofore, for pneumatic tires manufactured for driving on icy and snowy roads, or what are called studless tires, structures have been known in which circumferential grooves extending in a tire circumferential direction and having large groove widths (e.g., 7 mm or larger) and sipes extending in a tread width direction are formed.

Such pneumatic tires makes it possible to achieve improvement in draining rainwater, wet snow, or the like having entered gaps between the road surface and the tread surface, as well as prevention of skidding on icy and snowy roads.

PRIOR ART DOCUMENT

Patent Document

Patent Document 1: Japanese Patent Application Publication No. 2000-255217 (Pages 4 and 5, FIG. 1)

SUMMARY OF THE INVENTION

However, the conventional pneumatic tires described above have the following problem. Specifically, the formation of the circumferential grooves having large groove widths reduces the areas of land portions (blocks) constituting the tread surface, the number of sipes, and the like. Such reduction leads to the problem that although the drainage performance can be improved and skidding on icy and snowy roads can be prevented, the driving and braking performances on icy and snowy roads cannot be improved.

The present invention has been made with this problem taken into consideration and an object of the present invention is to provide a pneumatic tire whose driving and braking performances on icy and snowy roads are further improved while securing improvement in the drainage performance and prevention of skidding on icy and snowy roads To solve the above problems, the present invention has the following aspects. At first, in the first aspect of the present invention, in a pneumatic tire (a pneumatic tire 1A) a circumferential groove (for example, a circumferential groove 32) extending in a tire circumferential direction is formed by land portions (land portions 20) constituting a tread surface (a tread surface 10) coming into contact with a road surface. A flat groove portion (a flat groove portion 60) and an in-groove land portion (an in-groove land portion 70) are formed in the circumferential groove. The flat groove portion being a flat surface of a groove bottom of the circumferential groove. The in-groove land portion is raised toward the tread surface side from the groove bottom of the circumferential groove. A plurality of narrow grooves (multiple narrow grooves 80) extending in a tread width direction are formed in the in-groove land portion. A width of the circumferential groove in the tread width direction (a wide-groove width W1) is 5 to 30% of a width of the tread surface in the tread width direction (a tread width TW).

According to the above aspect, the flat groove portion is formed in the circumferential groove, and the wide-groove width is 5 to 30% of the tread width. According to such a structure, rainwater having entered the circumferential groove can be drained easily, whereby the drainage performance can be improved. Moreover, since snow can securely enter the circumferential groove, it is possible to prevent skidding on icy and snowy roads.

In addition, the in-groove land portion is formed in the circumferential groove, and the multiple narrow grooves extending in the tread width direction are formed in the in-groove land portion. According to such a structure, an effect of causing the narrow grooves to hook snow entering the circumferential groove (what is called edge effect) increases, whereby the driving and braking performances on icy and snowy roads can be further improved.

In another aspect, the circumferential groove is provided in plurality. the circumferential groove in which the flat groove portion and the in-groove land portion are formed has the largest width in the tread width direction among the plurality of circumferential grooves.

In the other aspect, a groove depth from the tread surface of the land portions to an upper surface portion (an upper surface portion 72) of the in-groove land portion (first groove depth D1) is 60 to 95% of a depth from the tread surface of the land portions to the groove bottom of the circumferential groove (second groove depth D2).

In the other aspect, a width of each of the narrow grooves in the tire circumferential direction (narrow-groove width W2) is 1 to 8 mm.

In the other aspect, an angle formed between each of the narrow grooves and a straight line perpendicular to an equatorial plane of the tire (narrow-groove angle α) is 0 to 45 degrees.

In the other aspect, a depth from a groove bottom (a groove bottom 81) of each of the narrow grooves to an upper surface of the in-groove land portion (narrow-groove depth D3) is 50 to 100% of a height from the groove bottom of the circumferential groove to the upper surface of the in-groove land portion (in-groove-land-portion height H).

In the other aspect, a clearance (a clearance 90) is formed between the in-groove land portion and the land portion located at an opposite side of the flat groove portion.

In the other aspect, a cross section of the flat groove portion taken along a plane extending in the tread width direction and a tire radial direction is in a same shape in the tire circumferential direction, and a distance from the flat groove portion to an equatorial plane of the tire in the tread width direction is constant in the tire circumferential direction.

In the other aspect, a plurality of lug grooves extending in the tread width direction are formed at least in part of the land portions.

In the other aspect, the number of the narrow grooves formed between each pair of the adjacent lug grooves is two to eight.

In the other aspect, cutout portions (cutout portions 85) extending respectively from the narrow grooves in the tread width direction are formed in a corresponding one of the land portions. A width of each of the cutout portions in the tire circumferential direction (a cutout width W3) is substantially equal to a width of each of the narrow grooves in the tire circumferential direction.

In the other aspect, a cross section of the in-groove land portion taken along a plane extending in the tread width direction and a tire radial direction is in a substantially rectangular shape.

In the other aspect, wherein a straight line (a straight line L3) extending along an end portion of the in-groove land portion located at the flat groove portion side is inclined with respect to an equatorial plane of the tire.

According to the present invention, it is possible to provide a pneumatic tire whose driving and braking performances on icy and snowy roads are further improved while securing improvement in drainage performance and prevention of skidding on icy and snowy roads.

MODES FOR CARRYING OUT THE INVENTION

Next, some examples of the pneumatic tire according to the present invention will be described by referring to the drawings. Note that portions that are the same or similar across the drawings to be described below are denoted by the same or similar reference numerals. However, it should be also noted that the drawings are schematic and dimensional proportions may differ from the actual ones.

Accordingly, specific dimensions and the like should be determined by taking into consideration the description to be given below. Moreover, dimensional relationships and proportions may differ from one drawing to another in some parts, as a matter of course.

First Embodiment

Structure of Tread Pattern

Figure 1:
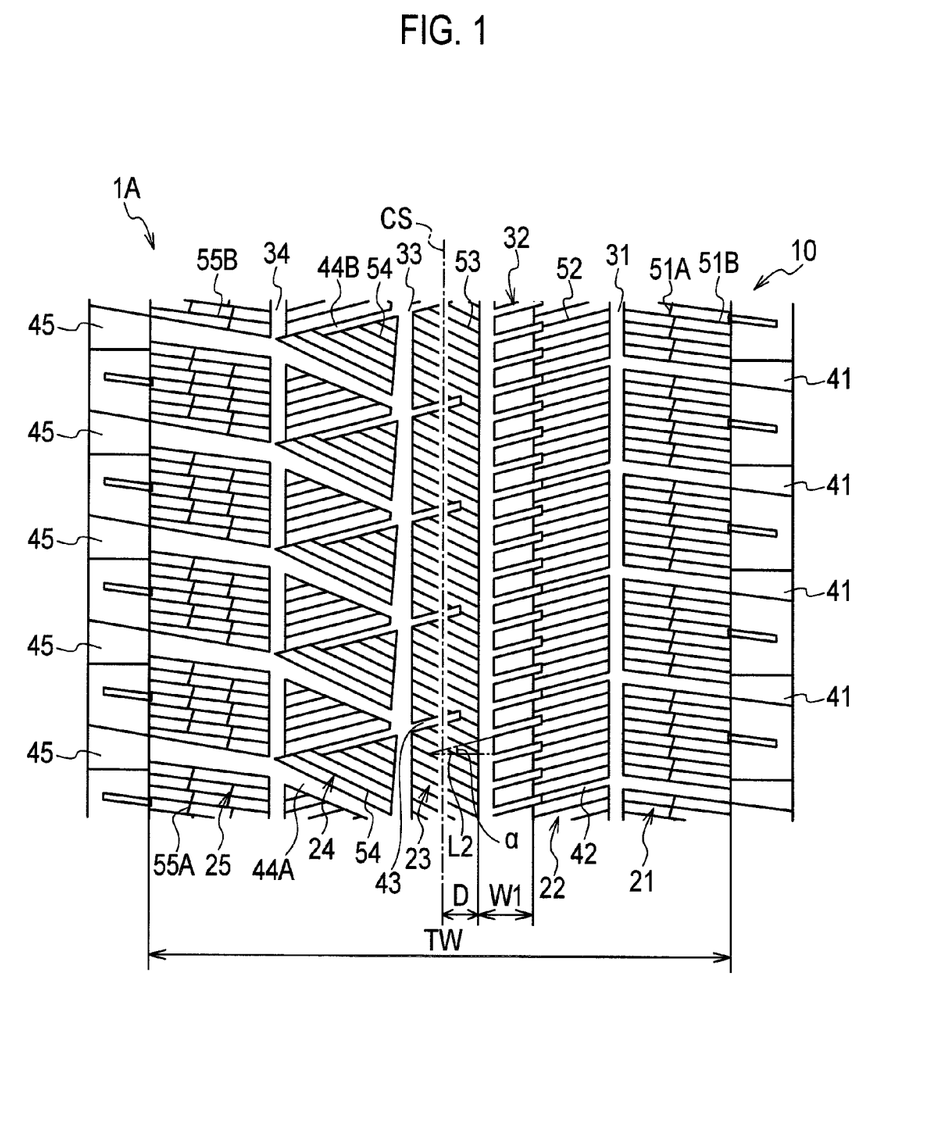
FIG. 1 is a developed view showing a tread pattern of a pneumatic tire 1A according to a first embodiment.
Figure 2:
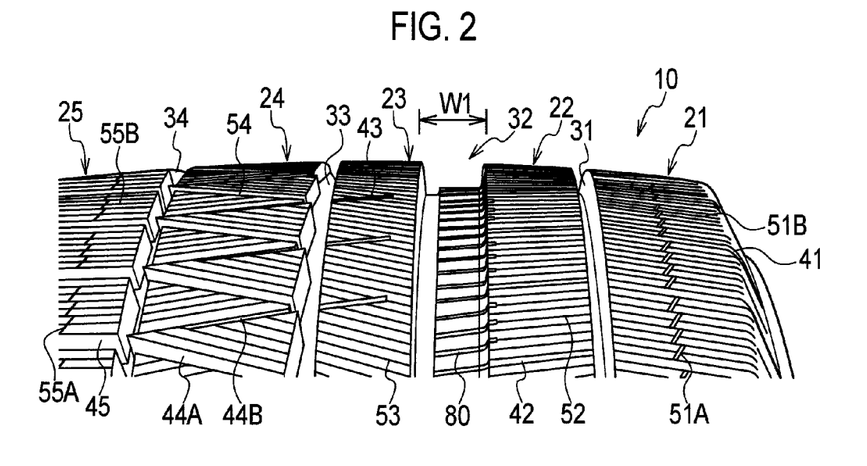
FIG. 2 is an enlarged view showing a part of the pneumatic tire 1A according to the first embodiment.

In the following, the structure of a tread pattern of a pneumatic tire 1A according to a first embodiment will be described by referring to the drawings. FIG. 1 is a developed view showing the tread pattern of the pneumatic tire 1A according to the first embodiment. FIG. 2 is an enlarged view showing a part of the pneumatic tire 1A according to the first embodiment.

The pneumatic tire 1A according to the first embodiment is a common radial tire including bead parts, a carcass layer, and a belt layer (not illustrated). Moreover, the pneumatic tire 1A according to the first embodiment has a pattern which is asymmetrical about the tire's equatorial plane CS.

As shown in FIGS. 1 and 2, the pneumatic tire 1A includes a tread surface 10 that comes into contact with the road surface, i.e., a land portion 20 that forms the surface of the tread part. By the land portion 20, formed are: multiple circumferential grooves 30 extending in the tire circumferential direction; multiple lug grooves 40 extending in the tread width direction; and multiple sipes 50 being narrower than any of the circumferential grooves 30 and the lug grooves 40.

The land portion 20 is provided in plurality at predetermined intervals in the tire circumferential direction and the tread width direction. These multiple land portions 20 correspond to a land portion 21, a land portion 22, a land portion 23, a land portion 24, and a land portion 25, from the right to the left in FIG. 1.

In the land portion 21, there are formed: multiple lug grooves 41 dividing the land portion 21; multiple sipes 51A extending in the tire circumferential direction; and multiple sipes 51B extending in the treat width direction. In the land portion 22, there are formed multiple lug grooves 42 dividing the land portion 22, and multiple sipes 52 extending in the tread width direction.

In the land portion 23, there are formed multiple lug grooves 43 extending substantially parallel to the lug grooves 42, and multiple sipes 53 extending in the tread width direction. One end portion of each lug groove 43 is opened to a circumferential groove 33 to be described later, whereas the other end portion of the lug groove 43 ends inside the land portion 23. In other words, the land portion 23 is formed into a rib shape.

In the land portion 24, there are formed: multiple lug grooves 44A dividing the land portion 24; multiple lug grooves 44B extending substantially parallel to the lug grooves 42 and the lug grooves 43; and multiple sipes 54 extending in the tread width direction. One end portion of each lug groove 44B is opened to the circumferential groove 33 to be described later, whereas the other end portion of the lug groove 43 ends inside the land portion 24. In the land portion 25, there are formed: multiple lug grooves 45 dividing the land portion 25; multiple sipes 55A extending in the tire circumferential direction; and sipes 55B extending in the tread width direction.

The multiple (four in the drawings) circumferential grooves 30 are provided at predetermined intervals in the tread width direction. In the following, these circumferential grooves 30 correspond to a circumferential groove 31, a circumferential groove 32, a circumferential groove 33, and a circumferential groove 34, from the right to the left in FIG. 1.

Among these multiple circumferential grooves 30, the circumferential groove 32 has the largest width in the tread width direction. The width of the circumferential groove 32 in the tread width direction (hereinafter, wide-groove width W1) is 5 to 30% of the width of the tread surface in the tread width direction (hereinafter, tread width TW).

(Structure of Circumferential Groove)

Figure 3:
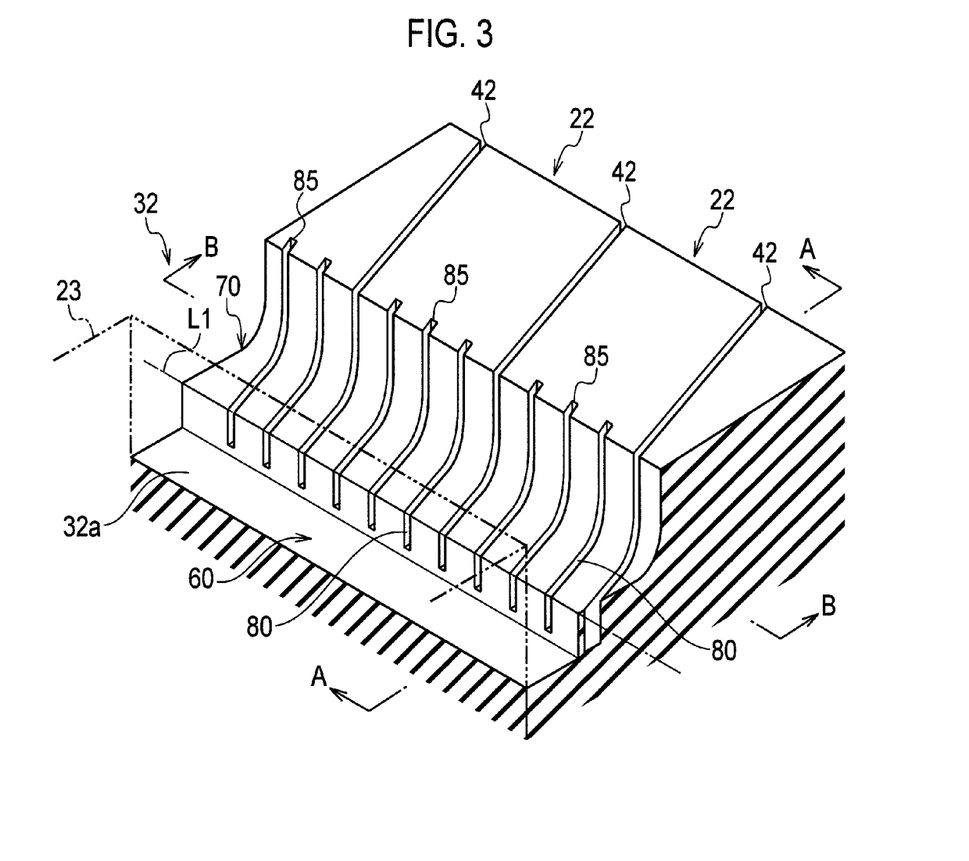
FIG. 3 is a perspective view showing a part of a circumferential groove 32 according to the first embodiment.
Figure 4:
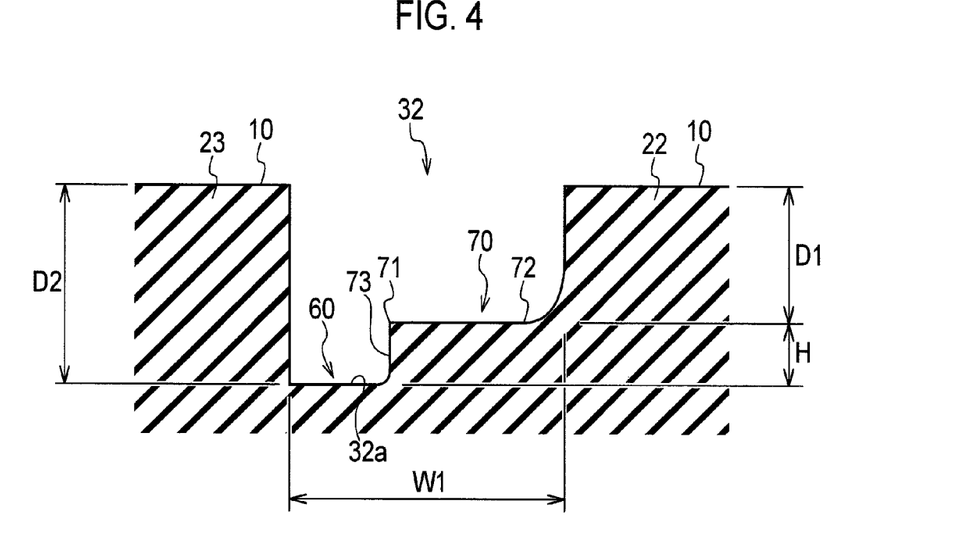
FIG. 4 is a cross-sectional view, in the tread width direction, of the circumferential groove 32 according to the first embodiment (cross-sectional view taken along the line A-A of FIG. 3).
Figure 5:
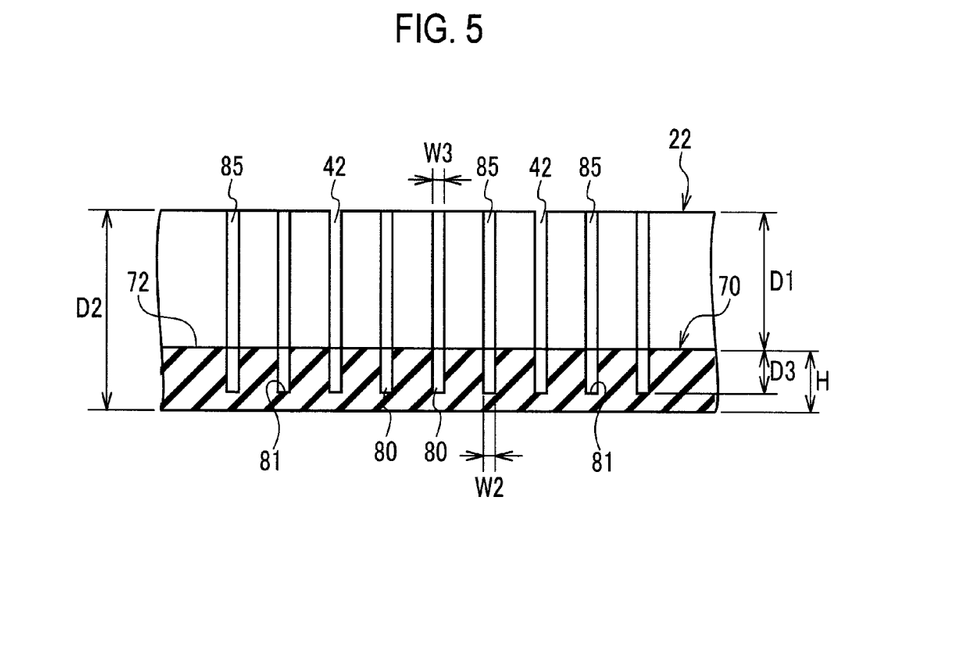
FIG. 5 is a cross-sectional view, in the tire circumferential direction, of the circumferential groove 32 according to the first embodiment (cross-sectional view taken along the B-B line of FIG. 3).

Next, the structure of the above-described circumferential groove 32 will be described by referring to the drawings. FIG. 3 is a perspective view showing a part of the circumferential groove 32 according to the first embodiment. In FIG. 3, the sipes 50 are omitted. FIG. 4 is a cross-sectional view, in the tread width direction, of the circumferential groove 32 according to the first embodiment (cross-sectional view taken along the line A-A of FIG. 3). FIG. 5 is a cross-sectional view, in the tire circumferential direction, of the circumferential groove 32 according to the first embodiment (cross-sectional view taken along the B-B line of FIG. 3).

As shown in FIGS. 3 to 5, the circumferential groove 32 includes therein a flat groove portion 60 and an in-groove land portion 70. The flat groove portion 60 is a flat surface of a groove bottom 32a of the circumferential groove 32, whereas the in-groove land portion 70 is a portion raised toward the tread surface 10 side from the groove bottom 32a of the circumferential groove 32.

The flat groove portion 60 is provided closer to the tire equatorial plane CS side than the in-groove land portion 70. The cross section of the flat groove portion 60 taken along a plane extending in the tread width direction and a tire radial direction is in a same shape in the tire circumferential direction (see FIG. 4). In addition, a distance D from the flat groove portion 60 to the tire equatorial plane CS in the tread width direction is constant the same in the tire circumferential direction (see FIG. 1).

The in-groove land portion 70 is formed to be continuous with the land portion 22 in the tread width direction. The cross section of the in-groove land portion 70 taken along a plane extending in the tread width direction and the tire radial direction is in a substantially rectangular shape (see FIG. 4). Specifically, in the cross section, an upper surface portion 72 of the in-groove land portion 70 extends in the tread width direction. Moreover, in the cross section, from an inner edge 71 (end portion) of the in-groove land portion 70 located at the flat groove portion 60 side, a groove wall 73 extends toward the flat groove portion 60 (the groove bottom 32a of the circumferential groove 32) in the tire radial direction.

A straight line L1 extending along the inner edge 71 of the in-groove land portion 70 located at the flat groove portion 60 side is substantially parallel to the tire equatorial plane CS (see FIG. 3). In other words, the straight line L1 extends in the tire circumferential direction.

A groove depth from the tread surface 10 of the land portion 22 to the upper surface portion 72 of the in-groove land portion 70 (hereinafter, first groove depth D1) is set to be 60 to 95% of a groove depth from the tread surface of the land portion 23 to the groove bottom 32a of the circumferential groove 32 (hereinafter, second groove depth D2) (see FIG. 4).

In the in-groove land portion 70, there are formed the lug grooves 42 continuous from the land portion 22, and multiple narrow grooves 80 extending in the tread width direction. The angle that each narrow groove 80 forms with respect to a straight line L2 perpendicular to the tire equatorial plane CS (hereinafter, narrow-groove angle α) is 0 to 45 degrees (see FIG. 1).

The number of narrow grooves 80 formed between the adjacent two lug grooves 42 is two to eight (three in the drawings). The width of each narrow groove 80 in the tire circumferential direction (hereinafter, narrow-groove width W2) is 1 to 8 mm (see FIG. 5).

A depth from a groove bottom 81 of each narrow groove 80 to the upper surface portion 72 of the in-groove land portion 70 (hereinafter, narrow-groove depth D3) is 50 to 100% of a height from the groove bottom 32a of the circumferential groove 32 to the upper surface portion 72 of the in-groove land portion 70 (hereinafter, in-groove-land-portion height H) (see FIG. 5).

Meanwhile, in the land portion 22, cutout portions 85 are formed which extend in the tread width direction from the respective narrow grooves 80 and end inside the land portion 22. The width of each cutout portion 85 in the tire circumferential direction (hereinafter, cutout width W3) is substantially equal to the narrow-groove width W2.

(Operation and Effect)

In the first embodiment, the flat groove portion 60 is formed in the circumferential groove 32, and the wide-groove width W1 is 5 to 30% of the tread width TW. According to such a structure, rainwater having entered the circumferential groove 32 can be drained easily, whereby the drainage performance can be improved. Moreover, since snow can securely enter the circumferential groove 32, it is possible to prevent skidding on icy and snowy roads.

If the wide-groove width W1 is smaller than 5% of the tread width TW, the amount of rainwater entering the circumferential groove 32 becomes so small that improvement in the drainage performance cannot be expected. Meanwhile, if the wide-groove width W1 is larger than 30% of the tread width TW, the contact area of the tread surface 10 with the road surface becomes so small that skidding on icy and snow roads cannot be prevented and the driving and braking performances cannot be improved.

In addition, the in-groove land portion 70 is formed in the circumferential groove 32, and the multiple narrow grooves 80 extending in the tread width direction are formed in the in-groove land portion 70. According to such a structure, an effect of causing the narrow grooves 80 to hook snow entering the circumferential groove 32 (what is called edge effect) increases, whereby the driving and braking performances on icy and snowy roads can be further improved.

In the first embodiment, among the multiple circumferential grooves, the circumferential groove 32 has the largest width as it has the wide-groove width W1. Moreover, the cross section of the flat groove portion 60 taken along a plane extending in the tread width direction and the tire radial direction is in a same shape in the tire circumferential direction. Furthermore, the distance D from the flat groove portion 60 to the tire equatorial plane CS in the tread width direction is constant in the tire circumferential direction. According to such a structure, rainwater having entered the circumferential groove 32 can be drained easily, whereby reduction in the drainage performance can be prevented.

In the first embodiment, the narrow-groove width W2 is 1 to 8 mm. By setting the narrow-groove width W2 to 1 mm or larger, the effect of causing the narrow grooves 80 to hook snow entering the circumferential groove 32 (what is called edge effect) increases, whereby the driving and braking performances on icy and snowy roads can be further improved. Meanwhile, by setting the narrow-groove width W2 to 8 mm or smaller, the resistance of rainwater or the like entering the circumferential groove 32 does not increase severely, whereby reduction in the drainage performance can be prevented.

In the first embodiment, the first groove depth D1 is 60 to 95% of the second groove depth D2. By setting the first groove depth D1 to 60% of the second groove depth D2 or larger, the volume of the circumferential groove 32 does not decrease excessively, whereby reduction in the drainage performance can be prevented. Meanwhile, by setting the first groove depth D1 to 95% of the second groove depth D2 or smaller, the effect of causing the narrow grooves 80 to hook snow entering the circumferential groove 32 (what is called edge effect) can be secured, whereby the driving and braking performances on icy and snowy roads can be further improved.

In the first embodiment, the narrow-groove angle α is 0 to 45 degrees. By setting the narrow-groove angle α to 45 degrees or smaller, the effect of causing the in-groove land portion 70 and the narrow grooves 80 to hook snow entering the circumferential groove 32 (what is called edge effect) increases, whereby the driving and braking performances on icy and snowy roads can be further improved.

In the first embodiment, the narrow-groove depth D3 is 50 to 100% of the in-groove-land-portion height H. By setting the narrow-groove depth D3 to 50% of the in-groove-land-portion height H or larger, the effect of causing the narrow grooves 80 to hook snow entering the circumferential groove 32 (what is called edge effect) can be secured, whereby the driving and braking performances on icy and snowy roads can be further improved. Meanwhile, by setting the narrow-groove depth D3 to 100% of the in-groove-land-portion height H or smaller, the effect of causing the narrow grooves 80 to hook snow entering the circumferential groove 32 (what is called edge effect) can be secured without decrease in rigidity of the in-groove land portion 70, whereby the driving and braking performances on icy and snowy roads can be further improved.

In the first embodiment, the multiple lug grooves 40 are formed at least in part of the land portions 20. According to such a structure, the driving and braking performances on dry roads are improved, in addition to those on icy and snowy roads.

In the first embodiment, the number of narrow grooves 80 formed between the adjacent two lug grooves 42 is two to eight. By providing two or more narrow grooves 80 between the adjacent two lug grooves 42, the effect of causing the narrow grooves 80 to hook snow entering the circumferential groove 32 (what is called edge effect) increases, whereby the driving and braking performances on icy and snowy roads can be further improved. Meanwhile, by providing eight or fewer narrow grooves 80 between the adjacent two lug grooves 42, the resistance of rainwater, snow, or the like entering the circumferential groove 32 does not increase severely, whereby reduction in the drainage performance can be prevented.

In the first embodiment, the cutout portions 85 are formed in the land portion 22 at such positions as to face their respective narrow grooves 80. The cutout width W3 is substantially equal to the narrow-groove width W2. According to such a structure, the effect of causing the narrow grooves 80 to hook snow entering the circumferential groove 32 (what is called edge effect) increases, whereby the driving and braking performances on icy and snowy roads can be further improved.

In the first embodiment, in the land portion 23 located at the tire equatorial plane CS side of the circumferential groove 32 where the flat groove portion 60 and the in-groove land portion 70 are formed, one end portion of each lug groove 43 is opened to the circumferential groove 32 whereas the other end portion of the lug groove 43 ends inside the land portion 23. According to such a structure, the resistance of rainwater, snow, or the like entering the circumferential groove 32 does not increase severely, whereby reduction in the drainage performance can be prevented.

(Modification)

The in-groove land portion 70 according to the above first embodiment is described as one formed to be continuous with the land portion 22 in the tread width direction, but may be modified in the following manner. Note that the same portions as those of the pneumatic tire 1A according to the above first embodiment will be denoted by the same reference numerals, and differences therebetween will be mainly described.

Figure 6:
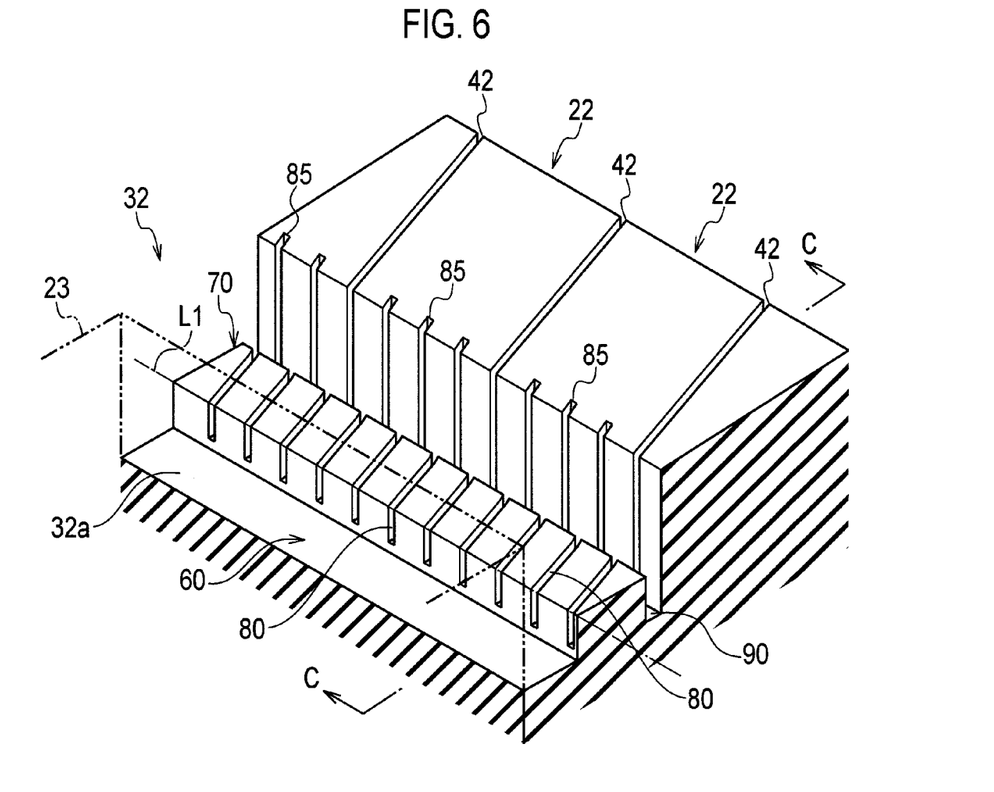
FIG. 6 is a perspective view showing a part of a circumferential groove 32 according to a modification.
Figure 7:
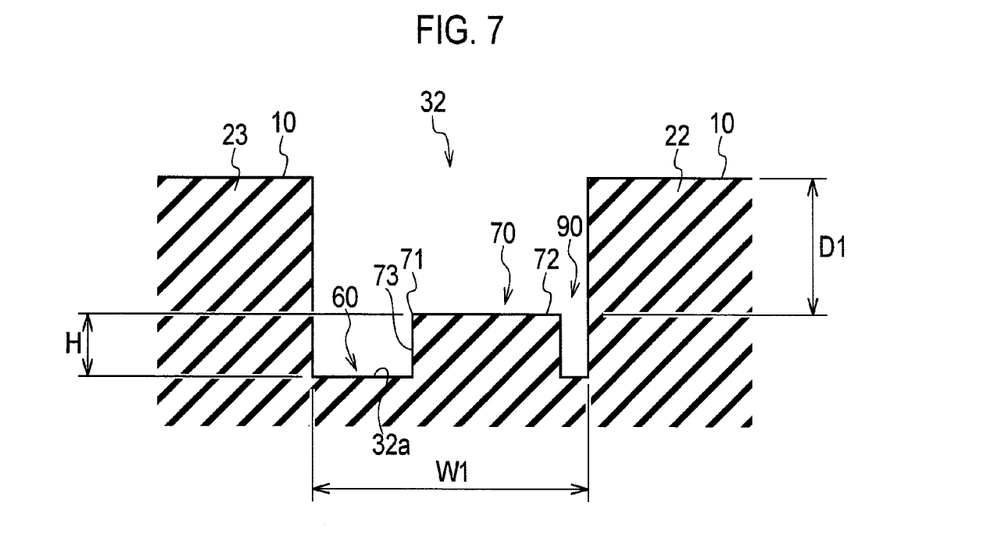
FIG. 7 is a cross-sectional view, in the tread width direction, of the circumferential groove 32 according to the modification (cross-sectional view taken along the line C-C of FIG. 6).

FIG. 6 is a perspective view showing a part of the circumferential groove 32 according to the modification. FIG. 7 is a cross-sectional view, in the tread width direction, of the circumferential groove 32 according to the modification (cross-sectional view taken along the line C-C of FIG. 6).

As shown in FIGS. 6 and 7, in the land portion 22 with the in-groove land portion 70 given right next thereto, the cutout portions 85 are formed at such positions as to face their respective narrow grooves 80. A clearance 90 is formed between the in-groove land portion 70 and the land portion 22 given right next to the in-groove land portion 70.

In this modification, the clearance 90 is formed between the in-groove land portion 70 and the land portion 22 given adjacent to the in-groove land portion 70. According to such a configuration, the clearance 90 can be secured in the circumferential groove 32 in addition to the flat groove portion 60. Hence, the drainage performance can be further improved.

Second Embodiment

Figure 8:
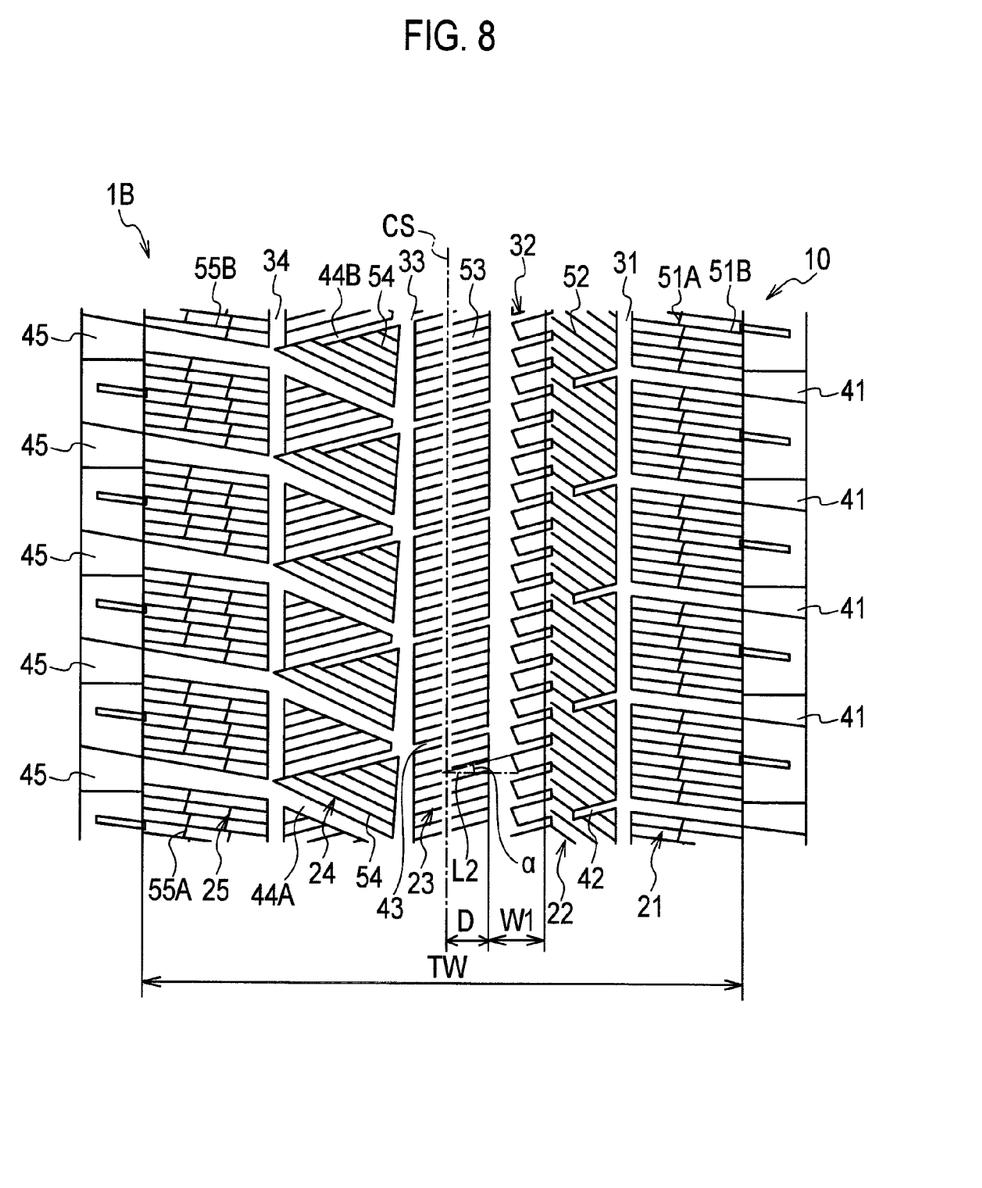
FIG. 8 is a developed view showing a tread pattern of a pneumatic tire 1B according to a second embodiment.
Figure 9:
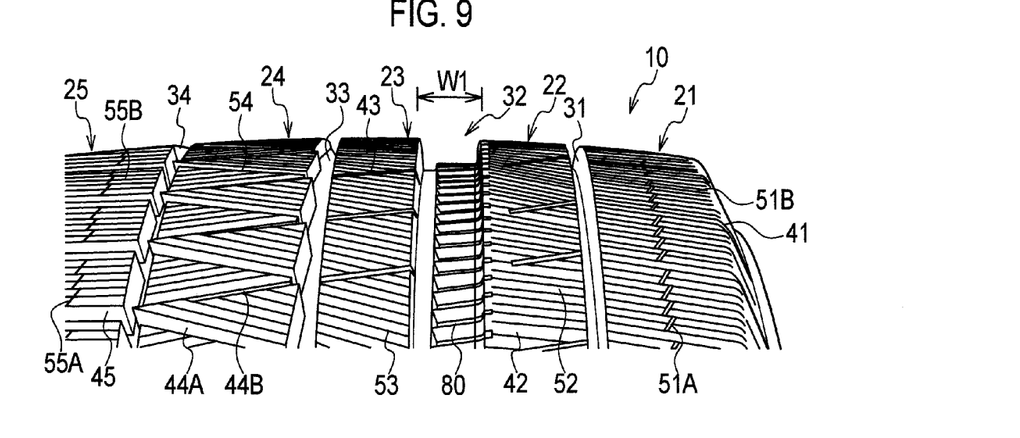
FIG. 9 is an enlarged view showing a part of the pneumatic tire 1B according to the second embodiment.
Figure 10:
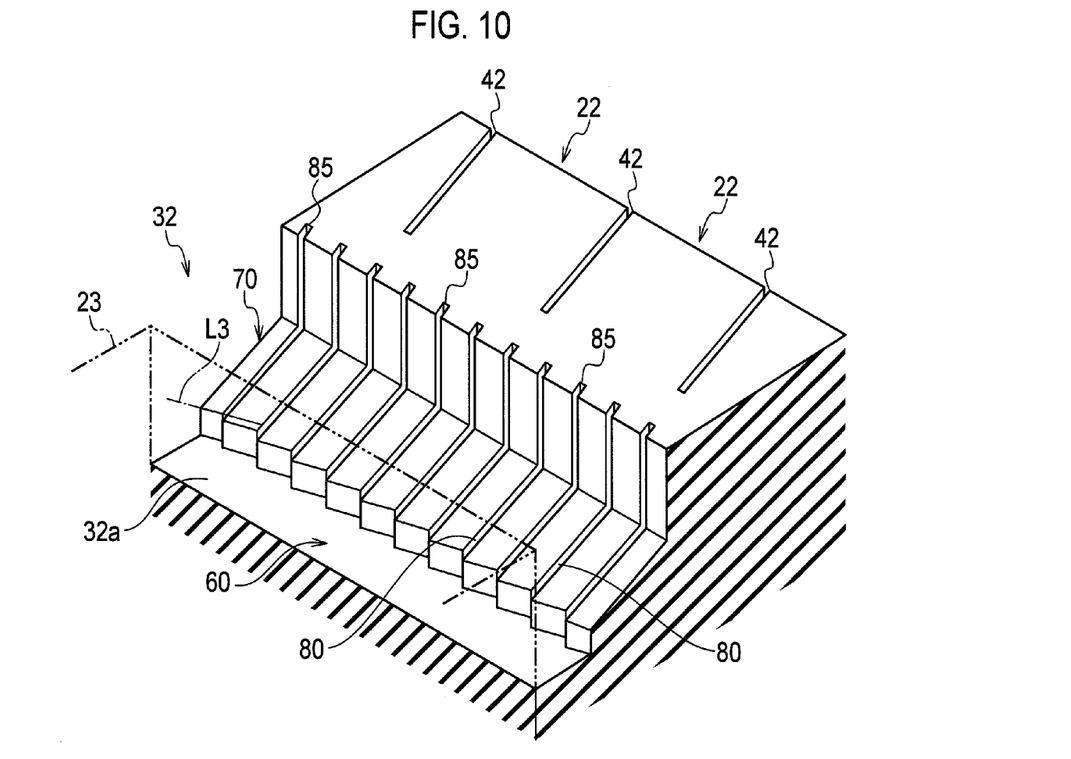
FIG. 10 is a perspective view showing a part of a circumferential groove 32 according to the second embodiment.

In the following, the structure of a tread pattern of a pneumatic tire 1B according to a second embodiment will be described by referring to FIGS. 8 to 10. FIG. 8 is a developed view showing the tread pattern of the pneumatic tire 1B according to the second embodiment. FIG. 9 is an enlarged view showing a part of the pneumatic tire 1B according to the second embodiment. In FIG. 9, the sipes 50 are omitted. FIG. 10 is a perspective view showing a part of a circumferential groove 32 according to the second embodiment. Note that the same portions as those of the pneumatic tire 1A according to the above first embodiment will be denoted by the same reference numerals, and differences therebetween will be mainly described.

As shown in FIGS. 8 and 9, in a land portion 22 located at the tread shoulder side of the circumferential groove 32, one end portion of each lug groove 42 is opened to the circumferential groove 31 whereas the other end portion of the lug groove 42 ends inside the land portion 22. In other words, the land portion 22 is formed into a rib shape.

In the land portion 23 located at the tire equatorial plane CS side of the circumferential groove 32, the lug grooves 43 divide the land portion 23.

As shown in FIG. 10, a straight line L3, which extends parallel to the inner edges 71 of the in-groove land portion 70 located at the flat groove 60 side, is inclined with respect to the tire equatorial plane CS. In other words, the inner edges 71 are formed into a zigzag shape with respect to the tire circumferential direction.

(Operation and Effect)

In the second embodiment, the straight line L3, which extends parallel to the inner edges 71 of the in-groove land portion 70 located at the flat groove 60 side, is inclined with respect to the tire equatorial plane CS. According to such a structure, an effect of causing the narrow grooves 80 to hook snow entering the circumferential groove 32 (what is called edge effect) increases, whereby the driving and braking performances on icy and snowy roads can be further improved.

(Comparative Evaluation)

Next, to further clarify the effects of the present invention, description will be given of a comparative evaluation carried out by using a pneumatic tire according to Comparative Example and the pneumatic tires according to Examples 1 and 2. Note that the present invention is not to be limited by these examples.

Data on each pneumatic tire was measured under the conditions listed below.

Tire size: 205/55R16
Wheel size: 6.5 J×16
Internal pressure condition: regular internal pressure By referring to Table 1, description will be given of tread pattern structure, steering performance on snow roads, braking performance on snow roads, driving performance on snow roads, performance on wet-snow roads, and performance against hydroplaning on rainy roads, of each pneumatic tire.

TABLE 1

| | Comparative Example | Example 1 | Example 2 |
|---|---|---|---|
| Negative ratio of tread surface | 30.3% | 30.3% | 30.3% |
| Wide-groove width W1 | 18 mm (9% of TW) | 18 mm (9% of TW) | 18 mm (9% of TW) |
| Narrow-groove angle α | — | 15 degrees | 15 degrees |
| Number of narrow grooves | — | 3 (grooves/pitch) | 3 (grooves/pitch) |
| Narrow-groove width W4 (Lug groove between narrow grooves) | — | 2 mm (2.8 mm) | 2 mm |
| Flat-groove width W2 | — | 5 mm | 7 mm |
| Steering performance on snow road | 100 | 107 | 106 |
| Braking performance on snow roads | 100 | 107 | 106 |
| Driving performance on snow roads | 100 | 108 | 107 |
| Performance on wet-snow roads | 100 | 107 | 108 |
| Performance against hydroplaning on rainy roads | 100 | 101 | 103 |

\* Negative ratio of tread surface = the ratio of grooves to tread surface (ground contact surface).

Now, the pneumatic tires according to Comparative Example and Examples 1 and 2 are described briefly. Note that these pneumatic tires have the same structures, except for the structures of the flat groove portion 60 and in-groove land portion 70 formed in the circumferential groove 32 and of the land portions 22 and 23 adjacent to the circumferential groove, which are to be described below.

Figure 11:
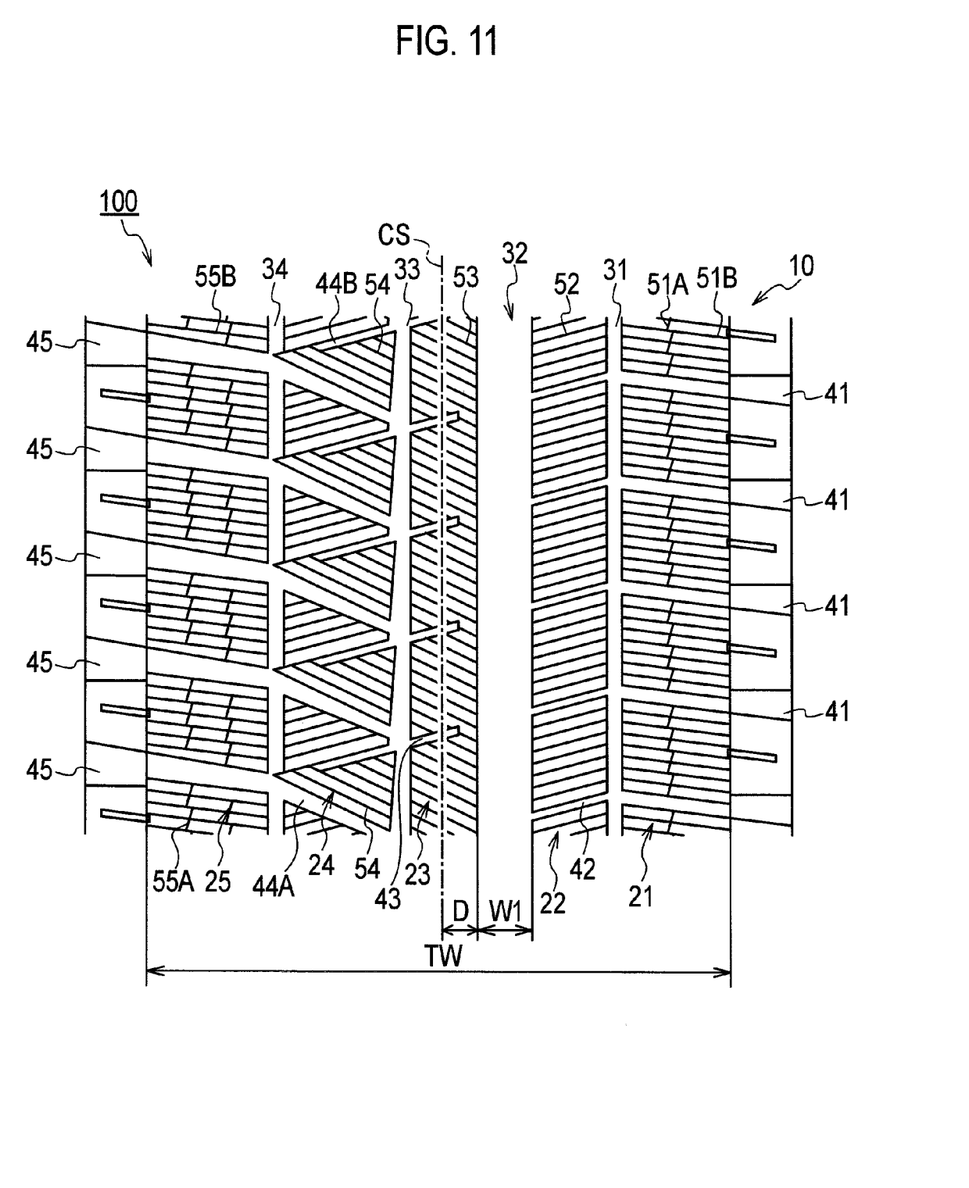
FIG. 11 is a developed view showing a tread pattern of a pneumatic tire 100 according to Comparative Example.

In the pneumatic tire 100 according to Comparative Example, the flat groove portion 60 and the in-groove land portion 70 are not formed in the circumferential groove 32. The land portion 23 located at the tire equatorial plane CS side of the circumferential groove 32 is formed into a rib shape (see FIG. 11).

In the pneumatic tire 1A according to Example 1, the flat groove portion 60 and the in-groove land portion 70 (narrow grooves 80) are formed in the circumferential groove 32, as described in the first embodiment. The straight line L1 extending along the inner edge 71 of the in-groove land portion 70 located at the flat groove portion 60 side is substantially parallel to the tire equatorial plane CS. The land portion 23 located at the tire equatorial plane CS side of the circumferential groove 32 is formed into a rib shape (see FIGS. 1 to 5).

In the pneumatic tire 1B according to the second embodiment, the flat groove portion 60 and the in-groove land portion 70 (narrow grooves 80) are formed in the circumferential groove 32, as described in the second embodiment. The straight line L3 extending parallel to the inner edges 71 of the in-groove land portion 70 located at the flat groove portion 60 side are inclined with respect to the tire equatorial plane CS. The land portion 22 located at the tread shoulder side of the circumferential groove 32 is formed into a rib shape (see FIGS. 8 to 10).

<Steering Performance on Snow Road>

The steering performance (total performance including the straight line stability, cornering performance, lane change performance, and the like) on snow roads was evaluated by driving vehicles equipped with the pneumatic tires on a snowy-road course. Note that in Table 1, the steering performance of each of the vehicles equipped with the pneumatic tires 1A and 1B according to Examples 1 and 2 is shown in the form of an index value that uses, as reference (100), the steering performance of the vehicle equipped with the pneumatic tire 100 according to Comparative Example. A larger index value means a better steering performance on the snow road.

The result shows that the vehicles equipped with the pneumatic tires 1A and 1B according to Examples 1 and 2 are superior to the vehicle equipped with the pneumatic tire 100 according to Comparative Example in terms of the steering performance on the snow road. In other words, the result shows that a pneumatic tire with the flat groove portion 60 and the in-groove land portion 70 formed in the circumferential groove 32 and the narrow grooves 80 formed in the in-groove land portion 70 can improve the steering performance on snow roads.

<Braking Performance on Snow Road>

The braking performance on snow roads was evaluated as follows. On a snowy-road course, vehicles equipped with the pneumatic tires were driven at a speed of 40 km/h, and the distances (braking distance) required for sudden stop of the vehicles in driving were measured. Note that in Table 1, the braking distance of each of the vehicles equipped with the pneumatic tires 1A and 1B according to Examples 1 and 2 is shown in the form of an index value that uses, as reference (100), the braking distance of the vehicle equipped with the pneumatic tire 100 according to Comparative Example. A larger index value means a better braking performance on the snow road.

The result shows that the vehicles equipped with the pneumatic tires 1A and 1B according to Examples 1 and 2 are superior to the vehicle equipped with the pneumatic tire 100 according to Comparative Example in terms of the braking performance on the snow road. In other words, the result shows that a pneumatic tire with the flat groove portion 60 and the in-groove land portion 70 formed in the circumferential groove 32 and the narrow grooves 80 formed in the in-groove land portion 70 can improve the braking performance on snow roads.

<Driving Performance on Snow Road>

The driving performance on snow roads was evaluated as follows. On a snowy-road course, vehicles equipped with the pneumatic tires were accelerated from a stopped state and driven a distance of 50 m, and the acceleration times of the vehicles were measured. Note that in Table 1, the acceleration time of each of the vehicles equipped with the pneumatic tires 1A and 1B according to Examples 1 and 2 is shown in the form of an index value that uses, as reference (100), the acceleration time of the vehicle equipped with the pneumatic tire 100 according to Comparative Example. A larger index value means a better steering performance on the snow road.

The result shows that the vehicles equipped with the pneumatic tires 1A and 1B according to Examples 1 and 2 are superior to the vehicle equipped with the pneumatic tire 100 according to Comparative Example in terms of the driving performance on the snow road. In other words, the result shows that a pneumatic tire with the flat groove portion 60 and the in-groove land portion 70 formed in the circumferential groove 32 and the narrow grooves 80 formed in the in-groove land portion 70 can improve the driving performance on snow roads.

<Performance on Wet-Snow Road>

The performance on wet-snow roads was evaluated as follows. On a course with wet snow having a liquid-water content of 80 to 90% (including slushy snow) under a temperature condition of 0±1 C.°, the vehicles equipped with the pneumatic tires were caused to accelerate, and then critical speeds at which the pneumatic tires mounted on the vehicles stopped making contact with the road surface were measured. Note that in Table 1, the critical speed of each of the vehicles equipped with the pneumatic tires 1A and 1B according to Examples 1 and 2 is shown in the form of an index value that uses, as reference (100), the critical speed of the vehicle equipped with the pneumatic tire 100 according to Comparative Example. A larger index value means a better performance on wet-snow roads road.

The result shows that the vehicles equipped with the pneumatic tires 1A and 1B according to Examples 1 and 2 are superior to the vehicle equipped with the pneumatic tire 100 according to Comparative Example in terms of the performance on wet-snow roads. In other words, the result shows that a pneumatic tire with the flat groove portion 60 and the in-groove land portion 70 formed in the circumferential groove 32 and the narrow grooves 80 formed in the in-groove land portion 70 can improve the performance on wet-snow roads.

<Performance against Hydroplaning on Rainy Roads>

The performance against hydroplaning on rainy roads was evaluated as follows. On a rainy road course having a water depth of 5 mm, the vehicles equipped with the pneumatic tires were driven, and then critical speeds at which hydroplaning occurred in which the pneumatic tires floated over the road surface and skidding occurred were measured. Note that in Table 1, the critical speed of each of the vehicles equipped with the pneumatic tires 1A and 1B according to Examples 1 and 2 is shown in the form of an index value that uses, as reference (100), the critical speed of the vehicle equipped with the pneumatic tire 100 according to Comparative Example. A larger index value means a better performance against hydroplaning on rainy roads.

The result shows that the vehicles equipped with the pneumatic tires 1A and 1B according to Examples 1 and 2 are superior to the vehicle equipped with the pneumatic tire 100 according to Comparative Example in terms of the performance against hydroplaning on rainy roads. In other words, the result shows that a pneumatic tire with the flat groove portion 60 and the in-groove land portion 70 formed in the circumferential groove 32 and the narrow grooves 80 formed in the in-groove land portion 70 can improve the performance against hydroplaning on rainy roads.

Other Embodiments

As described above, the details of the present invention have been disclosed by using the embodiments of the present invention. However, it should not be understood that the description and drawings which constitute part of this disclosure limit the present invention.

In the above embodiments, the flat groove portion 60 and the in-groove land portion 70 are described as ones formed in the circumferential groove 32 which has the largest width in the tread width direction among the multiple circumferential grooves 30, but are not limited to those. The flat groove portion 60 and the in-groove land portion 70 may be formed in one or more of the other circumferential grooves 30, as a matter of course.

In the above embodiments, the flat groove portion 60 is described as one provided closer to the tire equatorial plane CS than the in-groove land portion 70 and, but is not limited to this. The flat groove portion 60 may be provided, for example, on the opposite side, i.e., provided closer to the tread shoulder portion side than the in-groove land portion 70, as a matter of course.

In the above embodiments, the cross section of the in-groove land portion 70 taken along a plane extending in the tread width direction and the tire radial direction is described as being in a substantially rectangular shape, but is not limited to this. The cross section may be in a substantially triangular or trapezoidal shape, as a matter of course.

In the above embodiment, the pneumatic tire 1A is described as a common radial tire including bead parts, a carcass layer, and a belt layer (not illustrated), but is not limited to this. The pneumatic tire 1A may be a tire other than radial tire (e.g., bias tire), or a tubed tire.

From this disclosure, various alternative embodiments, examples, and operation techniques will be easily found by those skilled in the art. Accordingly, the technical scope of the present invention should be determined only by the matters to define the invention in the scope of claims regarded as appropriate based on the description.

Note that the entire content of Japanese Patent Application No. 2008-174656 (filed on Jul. 3, 2008) is incorporated herein by reference.

INDUSTRIAL APPLICABILITY

As described hereinabove, the pneumatic tire according to the present invention is a pneumatic tire whose driving and braking performances on icy and snowy roads are further improved while securing improvement in the drainage performance and prevention of skidding on icy and snowy roads, and is therefore useful for tire manufacturing techniques and the like.

The invention claimed is:

1. A pneumatic tire in which a circumferential groove extending in a tire circumferential direction is formed by land portions constituting a tread surface coming into contact with a road surface, wherein
a flat groove portion and an in-groove land portion are formed in the circumferential groove, the flat groove portion being a flat surface of a groove bottom of the circumferential groove, the in-groove land portion being raised toward the tread surface side from the groove bottom of the circumferential groove,
a plurality of narrow grooves extending in a tread width direction are formed in the in-groove land portion,
cutout portions extending respectively from the plurality of narrow grooves in the tread width direction are formed in a corresponding one of the land portions and ending inside the land portion, wherein a width of each of the cutout portions in the tire circumferential direction is substantially equal to a width of each of the narrow grooves in the tire circumferential direction, and
a width of the circumferential groove in the tread width direction is 5 to 30% of a width of the tread surface in the tread width direction, wherein a depth from a groove bottom of each of the narrow grooves to an upper surface of the in-groove land portion is 50 to 100% of a height from the groove bottom of the circumferential groove to the upper surface of the in-groove land portion.

2. The pneumatic tire according to claim 1, wherein
the circumferential groove is provided in plurality, and
the circumferential groove in which the flat groove portion and the in-groove land portion are formed has the largest width in the tread width direction among the plurality of circumferential grooves.

3. The pneumatic tire according to claim 1, wherein a groove depth from the tread surface of the land portions to an upper surface portion of the in-groove land portion is 60 to 95% of a depth from the tread surface of the land portions to the groove bottom of the circumferential groove.

4. The pneumatic tire according to claim 1, wherein a width of each of the narrow grooves in the tire circumferential direction is 1 to 8 mm.

5. The pneumatic tire according to claim 1, wherein an angle formed between each of the narrow grooves and a straight line perpendicular to an equatorial plane of the tire is 0 to 45 degrees.

6. The pneumatic tire according to claim 1, wherein a clearance is formed between the in-groove land portion and the land portion located at an opposite side of the flat groove portion.

7. The pneumatic tire according to claim 1, wherein
a cross section of the flat groove portion taken along a plane extending in the tread width direction and a tire radial direction is in a same shape in the tire circumferential direction, and
a distance from the flat groove portion to an equatorial plane of the tire in the tread width direction is constant in the tire circumferential direction.

8. The pneumatic tire according to claim 1, wherein
a plurality of lug grooves extending in the tread width direction are formed at least in part of the land portions, and
a lug groove of the plurality of lug grooves has one end portion opened to the circumferential groove and continuous from the land portion to the in-groove land portion.

9. The pneumatic tire according to claim 8, wherein the number of the narrow grooves formed between each pair of the adjacent lug grooves is two to eight.

10. The pneumatic tire according to claim 1, wherein a cross section of the in-groove land portion taken along a plane extending in the tread width direction and a tire radial direction is in a substantially rectangular shape.

11. The pneumatic tire according to claim 1, wherein a straight line extending along an end portion of the in-groove land portion located at the flat groove portion side is inclined with respect to an equatorial plane of the tire.

* * * * *